July 24, 1923.
G. B. COLEMAN
1,462,633
METHOD OF PRODUCING DIRECT CURRENT FROM AN ALTERNATING CIRCUIT
AND MEANS THEREFOR
Filed Feb. 26, 1920
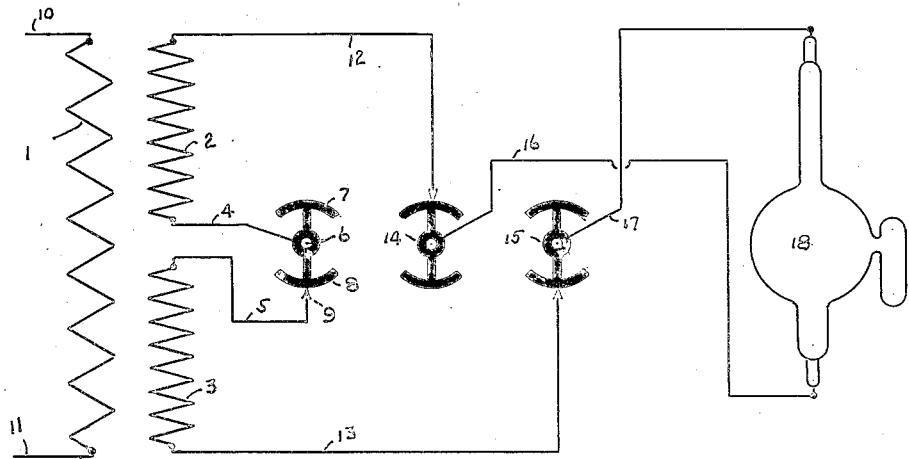
INVENTOR
BY George B Coleman
Miller & Henry
ATTORNEYS Patented July 24, 1923.

1,462,633

UNITED STATES PATENT OFFICE.

GEORGE B. COLEMAN, OF SAN FRANCISCO, CALIFORNIA, ASSIGNOR TO COLEMAN X-RAY COMPANY OF SAN FRANCISCO, CALIFORNIA, A CORPORATION OF CALIFORNIA.

METHOD OF PRODUCING DIRECT CURRENT FROM AN ALTERNATING CIRCUIT AND MEANS THEREFOR.

Application filed February 26, 1920. Serial No. 361,584.

*To all whom it may concern:*

Be it known that I, GEORGE B. COLEMAN, a citizen of the United States, and a resident of the city and county of San Francisco, State of California, have invented new and useful Improvements in Methods of Producing Direct Current from an Alternating Circuit and Means Therefor, of which the following is a specification.

My invention has for its object the production of a unidirectional current from an alternating current, and has particular reference to the prevention of sparking in rectifying or interrupting devices.

By referring to the accompanying drawings my invention will be made clear.

The figure is a diagrammatic showing of an alternating current transformer circuit and the method of rectifying the same and a unidirectional current circuit derived therefrom.

An alternating current primary is indicated by the numeral 1, the secondary winding 2, 3 being divided at the neutral point from which the leads 4, 5 are carried to an interrupting device 6, which is fitted with commutator segments 7, 8 adapted to alternately engage with the brush 9. The commutator 6 is to be rotated as by a synchronous motor which may advantageously be operated from the primary circuit 10, 11 such that its rotation and therefore interruptions on the commutator are in synchronism with the said circuit. The commutator is to be positioned on the shaft such that the circuit will be completed through 8 and 9 and subsequently through 7 and 9 during periods of induced current flow of one polarity; and said circuit will be interrupted, thus breaking the secondary at its neutral point, during periods of opposite polarity. There will therefore be set up in the secondary 2, 3 unidirectional waves of electromotive force and current which are available for use in the circuit 12, 13.

Reference is herein made to my copending applications Serial No. 327,513, filed Sept. 30, 1919; Serial No. 331,033, filed Oct. 16, 1919; Serial No. 331,034, filed Oct. 16, 1919; Serial No. 344,101, filed Dec. 11, 1919, in which the use of the interrupter or selector at the neutral point of various windings is fully set worth. In some instances, however, it is advisable to interrupt the outside circuit 12, 13 simultaneously with the interruption at the neutral point, and for this purpose I provide the commutator segments 14, 15, the former of which breaks the flow from 12 to 16, and the latter the flow from 13 to 17, substantially coincident with the interruptions of the commutator 6. In this way the tendency to sparking by any of the commutators is entirely prevented, even under very large current or electro-motive force, and the derived unidirectional current from the leads 16, 17 is available for use in any manner, as for example for the vacuum tube 18.

It is understood that the commutator segments as 7, 8 are to be of such dimensions that the commutator 6 is to rotate at a synchronous speed, such that continuity between 2 and 3 is maintained by the commutator segments only during one polarity of the induced phase. It is also advisable, although not necessary, to mount the three commutators 6, 14, 15 in suitable spaced relation and on the same shaft of a rotating synchronous motor operating on the same general circuit.

I claim:

1. The method of deriving unidirectional current from a transformer secondary which consists of interrupting the winding of said secondary at an intermediate point during the time of one polarity and simultaneously interrupting an external circuit connected to the terminals of said secondary, and completing the circuit at the intermediate point and at the terminals during the time of the other polarity.

2. The method of deriving unidirectional current as set forth in claim 1 wherein said transformer has a primary winding energized by an alternating current and wherein the interrupting means are operated in synchronism with said alternating current.

3. The method of deriving unidirectional current from the secondary winding of a transformer which consists of alternately completing and of interrupting throughout one half cycle the circuit of said secondary coincidentally at the center of said winding and in each leg of the circuit external to said winding.

4. The method of deriving unidirectional current as set forth in claim 3 wherein said interruptions are in synchronism with an impressed wage in the primary of the transformer.

5. A selecting mechanism in combination with a transformer secondary winding comprising a circuit interrupter interposed at an intermediate point of said winding and another interrupter in the derived circuit from said winding and means adapted to coincidentally actuate said interrupters, said interrupters constructed and adapted to interrupt the circuit of the said secondary both externally and at said intermediate point throughout the period of one phase and complete the said circuit of the said secondary throughout the period of the other polarity.

6. A selecting mechanism in combination with a transformer secondary winding comprising a circuit interrupter constructed and adapted to interrupt said circuit throughout one half cycle interposed at an intermediate point of said winding and another interrupter constructed and adapted to interrupt said circuit throughout one half cycle in the circuit supplied by said winding and means adapted to coincidentally actuate said interrupters in step with the periodicity of the circuit.

7. The method of deriving unidirectional current from a transformer secondary winding which consists in interrupting said winding at an intermediate point during one polarity and simultaneously interrupting connections between said secondary winding and an external circuit of utilization supplied from said secondary winding.

In testimony whereof, I have hereunto set my hand at San Francisco, California, this 21st day of February, 1920.

GEORGE B. COLEMAN.